May 16, 1939. R. B. AYER 2,158,845

CEMENTING PROCESS

Filed April 14, 1937

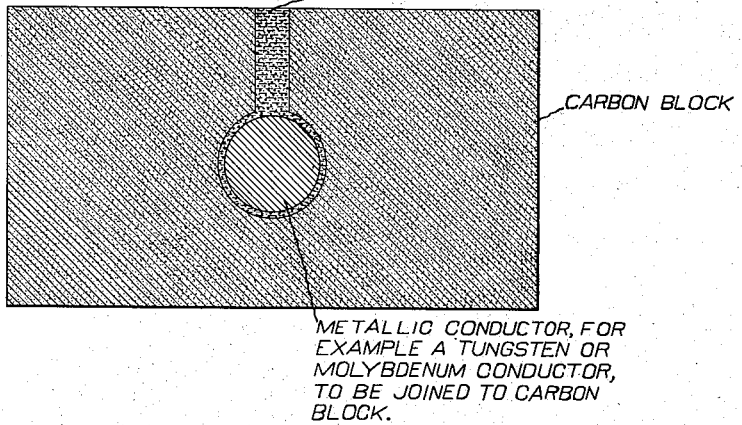

Fig. 1.

BEFORE FIRING

CEMENTING COMPOSITION COMPRISING A CARBONACEOUS AGGLUTINANT, FOR EXAMPLE A SUGAR SOLUTION AND A POWDERED METAL, FOR EXAMPLE IRON POWDER.

CARBON BLOCK

METALLIC CONDUCTOR, FOR EXAMPLE A TUNGSTEN OR MOLYBDENUM CONDUCTOR, TO BE JOINED TO CARBON BLOCK.

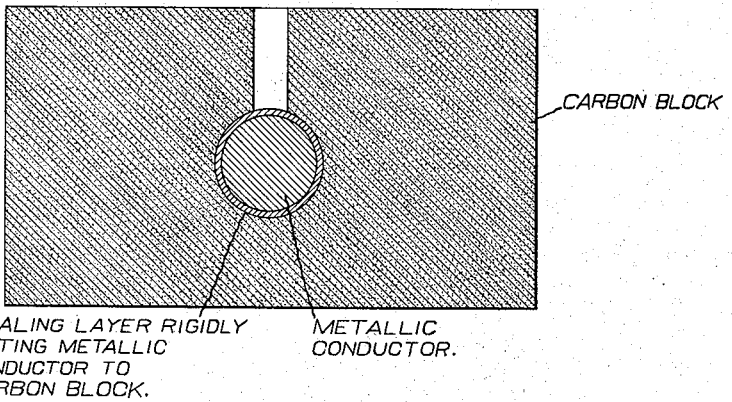

Fig 2.

AFTER FIRING

CARBON BLOCK

SEALING LAYER RIGIDLY UNITING METALLIC CONDUCTOR TO CARBON BLOCK.

METALLIC CONDUCTOR.

Inventor:
Raymond B. Ayer,
by Harry E. Dunham
His Attorney.

Patented May 16, 1939

2,158,845

UNITED STATES PATENT OFFICE 2,158,845

CEMENTING PROCESS

Raymond B. Ayer, Verona, N. J., assignor to General Electric Company, a corporation of New York Application April 14, 1937, Serial No. 136,793

3 Claims. (Cl. 176—38)

This invention relates broadly to a welding or cementing process and product. The invention is particularly directed to, and has as a main object to provide various improvements and modifications in the art of uniting a shaped carbon body either to another shaped carbon body or to a shaped body having a surface of pure metal or of alloy which with carbon will form solid carbides or with carbides will form solid alloys and in wire, sheet or other shaped form.

In practicing this invention use is made of a flux or cementing composition in paste form and comprising powdered metal and carbonaceous agglutinant, as hereinafter more fully will be described. The assembled parts, with facing surfaces covered with cemetitious substance, are heated in essentially a non-oxidizing atmosphere, that is, in an inert or a reducing atmosphere, at a temperature sufficiently high to carbonize the agglutinant and to form a metallic bonding agent containing carbon. This metallic, carbon-containing substance serves to bond rigidly together the shaped parts.

It has been suggested that metallic filaments used in the construction of incandescent lamps, for example filaments composed of metallic tungsten, molybdenum, columbium and the like, could be joined to lead-in conductors of such lamps, for instance to conductors composed of metallic iron, nickel, copper, platinum or their alloys by a method involving the use of a paste consisting of powdered metal such as powdered iron or nickel, powdered oxide of the same metal and a carbonaceous agglutinant. Joints between metals of the kinds hereinabove mentioned have been made heretofore by using a cementing composition consisting of graphite made into a paste with a carbonaceous agglutinant. However, such joints are unsatisfactory. The metallic filaments are held only loosely in the graphite.

Methods heretofore commonly employed in uniting shaped carbon bodies to each other, or in joining a shaped carbon body to a shaped metallic body, have involved the use of substantial mechanical pressure. In the electrical art mechanical pressure methods previously have been used, for example, in making electrical connections to graphite electrodes in electric discharge devices. When such devices are operated at low frequency and the magnitude of the current involved is relatively small, such methods have proved satisfactory. However, with increasing frequency and power requirements, it becomes more important to have low resistant connections in order both to reduce power losses and to prevent localized heating. Furthermore, simplified constructions are very desirable in electric discharge devices operated at ultra-high frequencies. Such ends are attained by practicing the present invention, which provides a union or joint between two or more shaped carbon articles or between shaped carbon and metallic bodies that, surprisingly, not only is satisfactory from an electrically conducting standpoint but which also is very strong mechanically. By this method microphonic effects resulting from loose or vibrating parts also are eliminated. Further, the method does not necessitate subjecting the assembled parts to mechanical pressure but involves merely the use of a particular cementing composition and heat treatment.

In order that my invention may be more fully understood and practiced by those skilled in the art to which it relates, I shall described it more in detail and point out its scope in the appended claims.

In carrying this invention into effect use is made of a flux or cementing composition in paste form. This flux either comprises or consists essentially of carbonaceous agglutinant and powdered metal or alloy which with carbon will form a carbide or with carbide will form an alloy. Examples of suitable metallic components of the flux are powdered nickel, cobalt, chromium, molybdenum, tungsten, uranium, vanadium, columbium, tantalum, titanium, zirconium, thorium or their alloys, which metallic ingredients may be used either singly or admixed. Examples of suitable carbonaceous agglutinants are animal, vegetable or mineral oils or carbohydrates such, for example, as sugars, starch or cellulose. When using a carbohydrate as the agglutinant, preferably it is dissolved, emulsified or otherwise intimately and uniformly mixed with a volatilizable, chemical inert liquid substance such as water. The ingredients are so proportioned as to form a paste capable of adhering tenaciously to the assembled parts at room temperature. A flux that has been used to advantage in practicing this invention is a paste-form composition consisting essentially of powdered iron, sugar and water. Any kind of sugar may be used, for example, cane sugar, milk sugar, dextrose (also known as grape sugar, corn sugar and glucose) or evulose (fruit sugar). The aqueous sugar composition may be formed by dissolving sugar crystals in water until, for instance, a saturated solution results. If desired, however, molasses of any of the grades or kinds commonly produced and marketed by sugar refiners, with or without additional water, in many cases may be used in lieu of a solution of crystalline sugar dissolved in water.

As illustrative of how this invention may be carried into effect, I shall describe a procedure employed in rigidly uniting shaped carbon and molybdenum bodies. It is to be understood, however, that this description is given for the purpose of illustration only and that the invention is not limited thereto.

A paste consisting essentially of pure iron powder (for example, what is known as hydrogen-reduced iron powder), sugar and water is first made. The iron powder and sugar may be dry mixed and water added thereto in an amount sufficient to form a mass of the desired consistency; or, the sugar may be dissolved in a suitable amount of water and the aqueous sugar solution of the desired fluidity then may be mixed with the powdered iron until a uniform pasty mass of the proper consistency results. Such a cementing composition may contain, for example, about 80 to 90 parts by weight of powdered hydrogen-reduced iron and about 20 to 30 parts by weight of saturated sugar solution.

The paste-form cementing composition is applied to previously cleaned facing surfaces of the shaped carbon and metallic molybdenum parts, using sufficient paste to coat thoroughly these surfaces and to provide an excess of paste at the junction. The parts are hand pressed firmly together before the paste has dried. If desired, the asembled parts may be air-dried in order somewhat to harden the cement. With or without air drying of the paste, the assembly finally is subjected, in an inert or reducing atmosphere, to a temperature sufficiently high to carbonize the sugar and to form a bonding agent comprising a carbon-containing ferrous substance, that is to say, an iron-carbon compound, which rigidly unites the shaped carbon and molybdenum bodies.

It is difficult to say whether or not the binding composition is an iron carbide, or an intimate association of iron and molybdenum carbides, or a solution of carbon in iron forming what might be described as a cast iron, or just what its exact composition is. Hence, I do not wish to be limited by any theories as to the composition of the joint between the two shaped bodies other than that it is a compound which, at the maximum temperature of heat treatment, is able to "wet" the facing surfaces of the bodies being united, at least one of which bodies is a shaped carbon article, and also when cold is able to hold to such surfaces with adamantine tenacity.

When uniting a shaped carbon body to another shaped carbon body or to a shaped molybdenum body, using a paste containing sugar and hydrogen-reduced iron powder, the assembly is heated in a non-oxidizing atmosphere, for example, in a hydrogen-atmosphere furnace or in a vacuum furnace, at a temperature ranging between about 1250° C. and about 1450° C., advantageously at a temperature of about 1400° C., and for a period of time varying from two or three minutes up to ten or possibly more, depending on the size of the parts being soldered. At such temperature the sugar decomposes and forms carbon, which unites with, or dissolves in the iron to provide an iron-carbon bonding agent.

The exact nature of the reactions which occur cannot be stated with certainty. It is possible that alloys or carbides of varying percentages of composition are formed and are instrumental in producing the desired results. It is also possible that the results are more or less dependent upon flow of the lower melting compositions into the porous structure of the graphite. Whatever the nature of the actual chemical or physical action which takes place, the fact remains that the welded or cemented article is not only mechanically strong in the joint but has satisfactory electrical properties. Graphite rods and tubes united within molybdenum cups and sheets, molybdenum wire fastened into a block of graphite, and a 0.35 inch diameter molybdenum button cemented to a large shaped graphite body, were made in accordance with the described procedure and then tested for mechanical strength. In each case the break occurred either in the molybdenum or graphite bodies, but never in the joint. When a graphite rod-molybdenum cup assembly was heated to 600° to 700° C. and tested, the graphite rod broke but the joint remained intact. Heating and cooling tests up to about 900° to 1000° C. have been made on molybdenum-graphite bodies cemeted in accordance with this invention without any indication that such changes in temperature detrimentally affected the physical characteristics of said composite body.

The described method may be applied to bodies of any shape and composed of, or having facing surfaces of metals such, for instance, as metallic iron, nickel, cobalt, chromium, molybdenum, tungsten, uranium, vanadium, columbium, tantalum, or the like, or alloys thereof.

In the case of graphite anodes having a molybdenum supporting rod passing through a hole in the shaped graphite body, the hole ordinarily provided may be replaced by a slot of any shape but for mechanical reasons a U-shaped slot is preferred. The rod is laid at the bottom of the slot and covered with cementing composition. Holes may be drilled from the outside into the main hole in the graphite body, and the paste introduced through such holes after the supporting rod is in place.

Other examples of practical applications of this invention include the bonding of molybdenum support leads and yokes to the two halves of a graphite anode and the cementing of graphite anodes to molybdenum leads for use a rectifier of the gaseous discharge type. In accordance with this invention molybdenum channels may be cemented to graphite protrusions, of similar shape or graphite parts may be held together by one or more overlapping strips of molybdenum. Graphite bodies may be cemented to shaped alloys of different kinds. Thus, I have been able to produce a strong and electrically satisfactory bond between graphite parts and rods composed of an iron, nickel, colbalt alloy known under the trade name of "Fernico" metal.

It is to be understood that the cementing composition may comprise various ratios of powdered metal and carbonaceous agglutinant. In obtaining cements of the same consistency, the proportions by weight of the ingredients of the cementing composition will vary as their specific gravities vary. It also may be necessary to vary the percentage proportion of the constituents of the cementing agent with variations in the selected constituents, with variations in the shaped metal body that is to be united to a shaped carbon body, and with variations in the subsequent processing, including heat-treating, operations. Although powdered iron is the preferred metal ingredient of the cement used in bonding a shaped graphite body to a shaped metal such as metallic molybdenum, it sometimes may be advantageous to replace the metallic iron, in whole or in part, with other suitable metals such, for instance, as nickel, cobalt, chromium, molybdenum and the like, which metals may be employed either singly or in the form of a mixture of two or more such metals.

It likewise is to be understood that the particular temperature or range of temperature employed will be governed by the nature of the metallic material to which the graphite body is being cemented and also by the composition of the cementing agent itself. The extent of the reaction at a given temperature is dependent, at least to some extent, upon the time of heating. In all cases, however, the temperature and period of heating must be sufficient to produce the desired reaction between the powdered metal of the cement and the carbon resulting from the decomposition of the agglutinant without causing excessive embrittlement or other substantial detrimental change in the properties of the shaped metal body. As illustrative of temperature variations that may be required with changes of materials, it is mentioned that whereas a temperature of about 1400° C. was found to give good results in cementing shaped metallic molybdenum to a shaped graphite body using a cement containing hydrogen-reduced iron powder, a temperature of about 1250° to 1300° C. proved effective in rigidly uniting nickel eyelets to a graphite grid cylinder.

As is well known the thermal expansion coefficients of metallic molybdenum and tungsten are very nearly the same as graphite. Hence the preferred composite body of this invention comprises a shaped metallic molybdenum or tungsten member rigidly united to a shaped graphite member with a bonding layer formed from a cementing composition containing preferably carbonaceous agglutinant and hydrogen-reduced iron powder; or, in certain cases, with a bonding layer formed from a cementing composition in which the iron has been wholly or partly replaced with metallic nickel, cobalt, chromium or molybdenum as hereinbefore more fully set forth.

In the accompanying drawing Figs. 1 and 2 are enlarged sectional views of a carbon block, more particularly a graphite anode, before and after being rigidly united to a metallic conductor in accordance with this invention. Fig. 1 represents the assembly before firing. It shows the conductor covered with a cementing composition, which fills the space between the conductor and the carbon block. The block may be slotted as shown to facilitate the application of the cementing composition to the conductor. Fig. 2 represents the assembly of Fig. 1 after firing, and shows the sealing layer that is formed, as hereinbefore described, from the cementing composition. This sealing layer rigidly unites the metallic conductor to the carbon block.

In accordance with another embodiment of this invention a shaped graphite body is coated with the described cementing composition and is then fired in a non-oxidizing atmosphere to produce a metallic coating to which metallic members subsequently may be brazed, soldered, welded or otherwise rigidly united by well-known means.

What I claim as new and desire to secure by Letters Patent of the United States, is:

1. The method of rigidly uniting a shaped carbon member to a shaped member of metal selected from the class consisting of metallic molybdenum and metallic tungsten which comprises covering facing surfaces with a cementing composition containing carbonaceous agglutinant and powdered iron, assembling the members in the position of ultimate rigid union, and heating the assembly in essentially a nonoxidizing atmosphere at a temperature between about 1250° C. and about 1450° C. for a period of time sufficient to form a compound of carbon and iron from the cementing composition and to unite said shaped members therewith.

2. The method of rigidly uniting a shaped carbon member to a member of metal selected from the class consisting of metallic molybdenum and metallic tungsten, which comprises covering facing surfaces with a cementing composition comprising sugar and hydrogen-reduced iron powder, assembling the members in the position of ultimate rigid union, and heating the assembly in essentially a non-oxidizing atmosphere at a temperature between about 1250° C. and about 1450° C. for a period of time sufficient to effect a rigid union between said carbon member and said metal member.

3. The method of rigidly uniting a carbon member to a molybdenum member, which comprises covering facing surfaces with a cementing composition comprising, by weight, about 80 to 90 parts powdered hydrogen-reduced iron and about 20 to 30 parts saturated sugar solution, assembling and pressing the said members together in the position of ultimate rigid union before the said composition has dried, and heating the assembly in essentially a non-oxidizing atmosphere at a temperature of approximately 1400° C. for a period of time sufficient to form a compound of carbon and iron from the cementing composition and to unite said members therewith.

RAYMOND B. AYER.